(12) United States Patent
Newman et al.

(10) Patent No.: US 8,161,381 B2
(45) Date of Patent: Apr. 17, 2012

(54) SYSTEM AND METHOD FOR PRESENTING MESSAGE THREADS

(75) Inventors: Paula S. Newman, Los Altos, CA (US); Michelle Q. Wang Baldonado, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 1031 days.

(21) Appl. No.: 11/827,145

(22) Filed: Jul. 9, 2007

(65) Prior Publication Data

US 2007/0300153 A1 Dec. 27, 2007

Related U.S. Application Data

(63) Continuation of application No. 09/732,024, filed on Dec. 8, 2000, now Pat. No. 7,243,125.

(51) Int. Cl.
  *G06F 17/21* (2006.01)
(52) U.S. Cl. ........................................ 715/255
(58) Field of Classification Search .................... 715/255
See application file for complete search history.

(56) References Cited

U.S. PATENT DOCUMENTS

| | | | |
|---|---|---|---|
| 5,875,256 A * | 2/1999 | Brown et al. | 382/186 |
| 5,905,863 A | 5/1999 | Knowles et al. | |
| 6,145,079 A | 11/2000 | Mitty et al. | |
| 6,381,592 B1 | 4/2002 | Reuning | |
| 6,381,634 B1 | 4/2002 | Tello et al. | |
| 6,427,032 B1 | 7/2002 | Irons et al. | |
| 6,484,196 B1 * | 11/2002 | Maurille | 709/206 |
| 6,525,747 B1 | 2/2003 | Bezos | |
| 6,631,398 B1 | 10/2003 | Klein | |
| 6,701,346 B1 * | 3/2004 | Klein | 709/206 |

OTHER PUBLICATIONS

Sproat et al., "Emu: An E-Mail Preprocessor for Text-To-Speech," IEEE Signal Processing Society 1998 Workshop on Multimedia Signal Processing, Dec. 7-9, 1998; pp. 1-6, Los Angeles, CA.
Chen, "Integrating Geometrical and Linguistic Analysis for Email Signature Block Parsing," ACM Transactions on Information Systems, vol. 17, No. 4. Oct. 1999, pp. 343-366, USA.
Tajima et al, "Cut as a Querying Unit for WWW, Netnews, and E-Mail," Department of Computer and Systems Engineering Kobe University, ACM 1998, pp. 235-244, Japan.
Yabe et al., "Automatic Animation of Discussions in USENET," Department of Mathematical and Computing Sciences Tokyo Institute of Technology, ACM 2000, pp. 84-91, Japan.

* cited by examiner

*Primary Examiner* — Laurie Ries
*Assistant Examiner* — Tionna Smith
(74) *Attorney, Agent, or Firm* — Patrick J. S. Inouye; Krista A. Wittman (57) ABSTRACT

A system and method for presenting message threads is provided. A main body and one or more excerpts are parsed from each of a plurality of messages into nodes structured to form a message tree through a procedural top-down recursive descent. The nodes in the message tree are related by determining line-group types for the main body and the excerpts of each message, which are enumerated into partitions for each of the line-group types. An output network of alternative paths through the messages is created based upon the partitions of the message tree. A document is formed from the output network to identify and remove redundant components in each message.

20 Claims, 7 Drawing Sheets

From: Pavel Velikho <pvelikho@cs.ucsd.edu>
Newsgroups: comp.lang.python
Subject: need some fast balanced-tree datastructure
Date: Mon, 21 Jun 1999 17:06:10 PDT Hi,
      I am looking for a fast implementation of incremental container that maintains an ordering on the keys... (i.e. I want an AVL, Red-Black, or anything similar). I have tried the b+tree in Python but its not fast enough. Is there anything like that available as a C extension module?

Thank you
Pavel Velikhov
pvelikho@cs.ucsd.edu
----
http://www.python.org/mailman/listinfo/python-list
================================================
Date: Mon 21 Jun 1999 21:04:32 PDT
From: David Ascher <da@ski.org>
To: Pavel Velikho <pvelikho@cs.ucsd.edu>
cc: python-list@python.org
Subject: Re: need some fast balanced-tree datastructure On Mon, 21 Jun 1999, Pavel Velikho wrote:
>    I am looking for a fast implementation of incremental container that maintains
> an ordering on the keys... (i.e. I want an AVL, Red-Black, or anything similar).
> I have tried the b+tree in Python but its not fast enough. Is there anything like that
> available as a C extension module?
> I've used Sam Rushing's AVL module with great success. It is available at:
      ftp://squirl.nightmare.com/pub/python/python-ext/avl Cheers,
-david ascher
----
http://www.python.org/mailman/listinfo/python-list
================================================
Subject: Re: need for some fast balanced-tree datastructure
References: <376ED372.FA73994F@cs.ucsd.edu>
From: Klaus Schuilling <Klaus.Schilling@home.ivrn.de>
Date: Tue, 22 Jun 1999 01:05:12 PDT Pavel Velikho <pvelikho@cs.ucsd.edu> writes:

>Hi,
>    I am looking for a fast implementation of incremental container that maintains
> an ordering on the keys... (i.e. I want an AVL, Red-Black, or anything similar).
> I have tried the b+tree in Python but its not fast enough. Is there anything like that
> available as a C extension module?

There is an avltree implementation in C by Ben Pfaff on the gnu ftp site
ftp.gnu.org/pub/gnu. Maybe this can be swigged to python.

Klaus Schilling
----
http://www.python.org/mailman/listinfo/python-list

FIG. 3

842. Pavel Velikho                    06/21/99 17:06

Hi,
I am looking for a fast implementation of incremental container that maintains
an ordering on the keys... (i.e. I want an AVL, Red-Black, or anything similar).
I have tried the b+tree in Python but is not fast enough. Is there anything like
that available as a C extension module?
Thank you.

---

849.          David Ascher    06/21/99 21:04

[Velikho: I am looking for a fast implementation of
incremental container that maintains an ordering on the
keys... (i.e. ...]

I've used Sam Rushing's AVL module with great success. It is
available at: ftp://squirl.nightmare.com/pub/python/python-ext/avl/

Cheers.

---

896.          Klaus Schilling  06/22/99 01:05

[Velikho: I am looking for a fast implementation of
incremental container that ...]

There is an avltree implementation in C by Ben Pfaff on the gnu ftp site
ftp.gnu.org/pub/gnu. Maybe this can be swigged to python.

FIG. 4

842.  Pavel Velikho                    /99 17:06

Hi,
I am looking for a fast implementation of incremental container that maintains an ordering on the keys...
(i.e. I want an AVL, Red-Black, or anything similar). I have tried the b+tree in Python but its not fast
enough. Is there anything like that available as a C extension module?
              Link to response from David Ascher 06/21/99 21:04
              Link to response from Klaus Schilling 06/22/99 01:05

Thank you

SYSTEM AND METHOD FOR PRESENTING MESSAGE THREADS

CROSS-REFERENCE TO RELATED APPLICATION

This patent application is a continuation of U.S. Pat. No. 7,243,125, issued on Jul. 10, 2007, application Ser. No. 09/732,024, filed Dec. 8, 2000, the priority filing date of which is claimed, and the disclosure of which is incorporated by reference.

FIELD

The present invention relates generally to the field of information display and, in particular, the presentation of e-mail threads as semi-connected text.

BACKGROUND

Dealing with a large volume of e-mail is recognized as a ubiquitous knowledge-worker problem. Not only does e-mail quickly accumulate in inboxes and other folders, with many contained threads left unread for long periods, but also people frequently need to become acquainted with the deliberations recorded in a high-volume public or private discussion. Numerous approaches have attempted to deal with the problem to some extent.

Conventional mailers and on-line archives list messages sorted by subject and date. This approach allows a user to focus on a single subject at a time, but requires that messages be viewed one at a time, in a fragmented way. Also, some mailers, such as Microsoft® Outlook®, may optionally supply the first few lines of a message in a folder listing. However, this system uses any material, including quoted passages, to produce these lines. Thus, redundant information is viewed rather than the new subject matter of the particular e-mail.

In another approach to dealing with the volume problem, some conventional mailing list managers permit digested subscriptions. Examples of such mailing lists managers include ListProc, LISTSERV Lite, MajorDomo and SmartList. Such managers allow users to elect to receive collections of messages within a single external message, often once per day, to reduce the frequency of messages received from the associated list and to reduce reading fragmentation. The digested subscriptions permit more efficient reading by combining submissions into a single message. Reading a collection of related messages in a single document can lessen the cognitive burden on a user to recall the context surrounding an individual message. However, automatic digests may only capture small parts of a conversation and also may include more than one conversation. So, reading a single thread requires inspection of a number of digests, and reading material from a single thread within a digest is often interrupted by material from other threads. Also, while digests may omit some irrelevant parts of message headers, they do not deal with other types of redundant or irrelevant material whose presence inhibits efficient reading. Examples of unnecessary information include an entire earlier mail message (or message chain) for reference, long quotes from one or more earlier messages, signature boxes, aphorisms and the like. When an individual message is viewed without previous messages available, extensive contextual information may be necessary for comprehension, but when a message appears in a digest, or is read in its place in a threaded sequence, the contextual information may seem superfluous and may also interfere with the reading sequence because readers must devote time to dealing with the redundant information. The readers must at least skim past this redundant information to look for new material.

Removing extraneous material requires analyzing the content of the message to some extent. One approach to message analysis, for a different purpose, is described by R. Sproat and H. Chen in, *EMU: An Email Preprocessor for Text to Speech*, IEEE Signal Processing Society Workshop on Multi Media Signal Processing, Los Angeles, 1998. This paper describes a combination of finite state machines. The first finite state machine assigns a set of weights to each line, one for each of eight fixed, relatively coarse, line classes. This automaton operates on the lines encoded into sequences of character classes (upper and lower case letters, digits, different kinds of punctuation) and is trained on tagged lines. The resulting network is then combined with another automaton which imposes additional restrictions, such as requiring that all lines in a blank-line-separated block be of the same type. This second automaton operates only to constrain the results of the first one. The resulting, relatively coarse analysis is suitable to a vehicle designed for a text-to-speech application, in which all the material is to be read. Therefore, a detailed line-type analyses based on a full message grammar that is intended to isolate material which may be omitted or elided (e.g., quoted passage introductions, message closings, aphorisms or the like) and some material which must be differentially formatted (e.g. program code, which frequently appears in software-related discussions) is not attempted in this approach. It is, however, used in conjunction with a further approach that is needed to allow reading of message endmatter, which may be two-dimensional.

H. Chen and R. Sproat, describe the further analysis in a paper entitled *Integrating Geometrical and Linguistic Analysis for Email Signature Block Parsing*, ACM Transactions on Information Systems, Volume 17, No. 4, October 1999. The more detailed analysis reanalyzes the end parts of messages that were processed by the automatons described in the previous paper. The analysis combines geometric analysis to detect vertical sections of blocks and another weighted finite state machine to analyze and verify alternative vertical section decompositions using detailed linguistic criteria.

A paper entitled *Cut as a querying unit for WWW, Netnews, email* by T. Keishi, Y. Mizuuchi et al., in Proceedings of the Ninth ACM Conference on Hypertext and Hypermedia Links, Objects, Time and Space Structure in Hypermedia Systems, 1988, p. 235, discloses a specification of a method for detecting quotes and for using these quotes in threading e-mails.

U.S. Pat. No. 5,905,863 discloses a method for finding a best single message predecessor in a thread, using quoted vs. non-quoted text comparisons and also using statistically-based message text comparisons.

A paper entitled *Automatic animation of discussions in USENET* by J. Yabe, S. Takahashi and E. Shibayama in Proceedings of AVI 2000, Palermo, provides a discussion of linear sequencing of message segments such that elements of messages responding to a passage are arranged near that passage.

All documents cited herein, including the foregoing, are incorporated herein by reference in their entireties.

SUMMARY

The method and apparatus of the present invention presents an e-mail thread as a single readable document in which extraneous material has been removed. The method and apparatus of the present invention also interlinks the individual messages and generally consistently formats the document. The method and apparatus identifies the logical components of a message, determines the conversational relationships among the messages and then structures and formats the core components into a single document to facilitate efficient assimilation of the structure and content of the contained conversations. The method and apparatus of the present invention obtains an adequate delineation of material to be retained and omitted using a single weighted finite state machine for the core process.

The method and apparatus of the present invention provides two basic techniques for structuring threads as documents. The first technique presents messages in a semi-linear message sequence in which embedded quotes are abbreviated, included messages are eliminated and links are provided to allow full access to the quotes. The second technique presents blocks that constitute responses to a particular passage as annotations to the passage in the original message via inlining, margin text, framing, links or other similar display strategies.

BRIEF DESCRIPTION OF THE DRAWINGS

Embodiments of this invention will be described in detail, with reference to the following figures:

FIG. 3 shows a display of a thread in accordance with a conventional digesting mailing list application with full headers and trailers;

These and other features and advantages of this invention are described in or are apparent from the following detailed description of embodiments.

DETAILED DESCRIPTION

Figure 1:
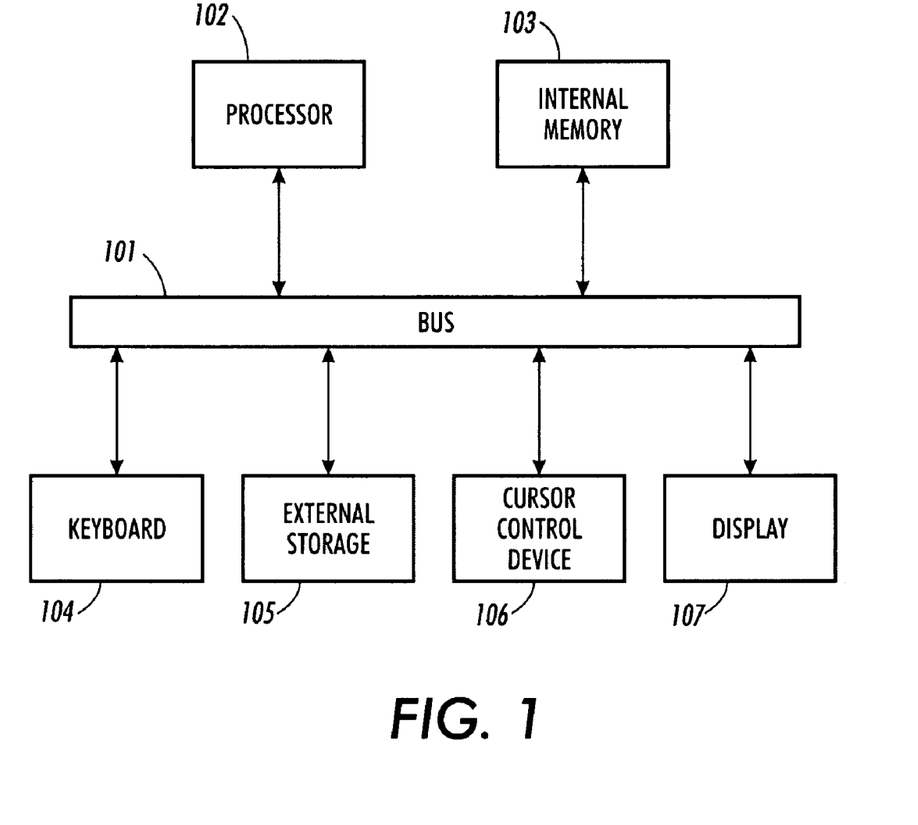
FIG. 1 is a block diagram of a computer controlled display system in one the embodiments of the present invention.

The computer based system on which one embodiment of the present invention may be implemented is described with reference to FIG. 1. Referring to FIG. 1, the computer based system is comprised of a plurality of components coupled via a bus 101. The bus 101 may include a plurality of parallel buses (e.g. address, data and status buses) as well as a hierarchy of buses (e.g. a processor bus, a local bus and an I/O bus). The computer system further includes a processor 102 for executing instructions provided via bus 101 from internal memory 103 (note that the internal memory 103 is typically a combination of random access and read only memories). The processor 102 will be used to perform various operations in support of creating the tree visualizations. Instructions for performing such operations are retrieved from internal memory 103. Such operations that would be performed by the processor 102 are described with reference to FIG. 2. The processor 102 and internal memory 103 may be discrete components or a single integrated device such as an application specification integrated circuit (ASIC) chip.

Also coupled to the bus 101 are a keyboard 104 for entering alphanumeric input, external storage 105 for storing data, a cursor control device 106 for manipulating a cursor, and a display 107 for displaying visual output. The keyboard 104 would typically be a standard QWERTY keyboard but may also be telephone like keypad. The external storage 105 may be fixed or removable magnetic or optical disk drive. The cursor control device 106, e.g. a mouse or trackball, will typically have a button or switch associated with it to which the performance of certain functions can be programmed.

The present invention identifies logical components of each message within a thread, determines the conversational relationships among messages, and then structures and formats the core components of the messages within each thread into a single document to facilitate efficient assimilation of the structure and content of the thread conversation. The message analysis technique delineates material to be retained and omitted using a single weighted finite state machine for the core process.

In a first presentation technique, the messages in a thread are presented in a semi-linear message sequence in which embedded quotes are abbreviated, included messages are eliminated and links are provided to allow access to full quotes. In a second presentation technique, blocks constituting responses to a particular passage are presented as annotations to the passage in the original message via inlining, margin text, links or the like.

The overall exemplary embodiment of the present invention includes at least three steps: 1) identifying the logical components of a message; 2) determining the relationships among messages; and 3) structuring and formatting each thread of a collection into a single readable document based on information gathered in previous steps.

More specifically, the step of identifying logical components of a message obtains a message tree that includes nodes that divide the message into a main body and excerpts from other messages that are either embedded in the main body or suffixed. This step also involves decomposing these sections into group types such as text-blocks, tables, contact information and the like.

The message tree is developed in stages. First, the message lines are submitted to an analysis that performs the initial division of the message into the main body and nested excerpts. This analysis is achieved by a procedural, top-down recursive descent analyzer that parses based on such features as quoting, (such as ">" line prefixes) labeled quotes (such as "John>") additional headers, whether quoted or not, excerpt introductions (such as " . . . original message . . . ") and the like. Additionally, for each excerpt any available header information, whether from true nested headers or from conventional introductory information (such as "At time person wrote") is extracted and stored at the node for use in a second step (determining message relationships).

Then each body section, either of the top-level message or an incorporated excerpt, is further analyzed in more detail. The body section, which may have incorporated excerpts, is logically concatenated to a single extent. Then a weighted finite state grammar is used to obtain a best-guess partitioning into line-group types, such as, for example, paragraphs, code sections, and the like. The finite state grammar may be a manually coded grammar that includes an array of arc descriptors that each indicate a start and end state, a test-type associated with the arc, and a set of 1-3 tags. For example, one of the arcs originating in a state following a blank line might specify a "text" test, along with the tags "TSECT," and "TEXT." The states represent situations after particular line types and the arcs represent the kinds of lines that might appear in this situation. For example, greetings only appear at the beginning of messages while aphorisms might follow signatures or contact material.

The finite state grammar coding may also include a set of procedurally coded tests, one for each of the arc-specified test types. Each such test assigns a weight to the associated output network arc based on the extent to which the input line conforms to the type associated with the test.

Robustness is obtained by associating each state with a default arc with a low weight. The default arc is used when no other arc test yields a non-zero weight.

The grammar is then used to create an output network of alternative paths, with each arc simultaneously corresponding to a line of a message and an arc of the grammar. Each output network arc is also associated with a cumulative weight, which is the maximal weight of the partial paths terminating at that arc. After the output network is developed, a simple backwards search identifies the maximally weighted path.

The analysis-results subtree is developed by traversing the maximally weighted path in a forward direction to create a message tree guided by the tags of the associated grammar arc. For example, if an output arc corresponded to the grammar arc mentioned above, two tree nodes would be created, a "TSECT" node indicating a paragraph, and a "TEXT" node as its first child. Similarly, if an output arc represented by a dividing line closing the paragraph, a tag sequence "TSECT_END," "DIV_LINE" would close the paragraph node, and add a "dividing line" sibling node. After the separate subtrees are developed for each message section, they are combined into a single tree.

This approach of the present invention permits a high degree of flexibility in building, tuning and maintaining the grammar. Both the recursive descent and the finite state-controlled processors can incorporate a variety of criteria ranging from surface line appearance (such as use of a non-initial tab character to suggest a table), to relationships with other parts of the message (such as the use of matches between potential signatures and header information) to simple linguistic tests. This flexibility allows a detailed analysis if the bulk of extraneous message material is to be successfully tagged. This flexibility also allows for simple, continuing upgrading which is needed in an area of continuously evolving stylistic conventions. The grammar elements and the associated tests may be tuned by testing on samples of messages from a variety of e-mail corpora.

In the second step of this embodiment, the material obtained in the initial analysis is used to relate messages to match excerpts with their sources and to identify the predecessor or predecessors for each message. These two processes are interlaced so that matching excerpts may contribute to the identification of predecessors, but may also be assisted by the results of predecessor identification. First, an attempt to match each excerpt with its source is done. Hashed line parts from top-level excerpts, or, for sections that have been tagged as prose, hashed sentence parts are matched with those of earlier messages. While hashed line parts have previously been used in threading, the use of hashed sentence parts are unique. This is important because the partitioning of an excerpt into the lines may vary between the quoting and quoted messages. Nevertheless, matching such excerpts may not always yield useful results because excerpted passages may be elided in odd ways, or the matches may not be sufficiently definitive. For example, only one part of a sentence might match. The next step is to try to find the predecessors of each message, based on a combination of evidence including header fields, header fields of included messages, excerpted text and the like. Additionally, for a semi-linear presentation, the latest predecessor is identified if there are several. Then, further attempts are made to match previously unmatched excerpts using more costly techniques than are feasible in a broad-brush approach over a corpus.

The analysis in the first two steps enables the collation of the messages into either of two conversational document forms. In a first presentation technique a compressed form of each message is created. The compressed form of each message contains the non-extraneous parts of the primary text, interspersed with abbreviated, attributed top-level quotes. The different logical components of the message are formatted consistently across messages and appropriately to the component type. For example, the sentences of prose paragraphs are formatted into uniform-width collections, and message lines representing sample program code are formatted using a fixed-width font. Then each thread is structured according to the technique described in co-assigned, co-pending patent application entitled METHOD AND SYSTEM FOR PRESENTING SEMILINEAR HIERARCHY DISPLAYS, Ser. No. 09/732,028, filed concurrently herewith, the disclosure of which is incorporated by reference herein in its entirety, and in which each compressed message is inserted into the appropriate place in that structure to form a combined document.

A second presentation technique treats message replies as collections of annotations on the previous message. The first-level components identified in the analysis phase are further labeled by heuristic means as to whether they are "response blocks", such as a response to a quoted excerpt, or "non-response blocks," and, if the former, to which excerpts they are responses. This second presentation technique displays response blocks together with the original text (quote) to which the block is a response.

A variety of display strategies are possible with this second presentation technique in accordance with an embodiment of the present invention, ranging from inlining the text and marking it visually as a response, to placing the response text in the "margins" of the message, to using fluid display techniques that show the response via progressive disclosure in the context of the original text or equivalents. In general, any established technique for displaying annotations are appropriate for this step in the technique.

Non-response blocks may appear after the message to which they are responding. If multiple messages are responding to a single message, then the results of the "relationship determining" step are used to order the non-response blocks, with all non-response blocks from a single message forming a non-divisible unit.

The second presentation technique can also be usefully combined with the first presentation technique. In other words, the semi-linear form can be used as an overall presentation structure. However, within that structure, response blocks can be given as annotations, but linked to the full messages of which they are a part in the semi-linear structure.

Figure 2:
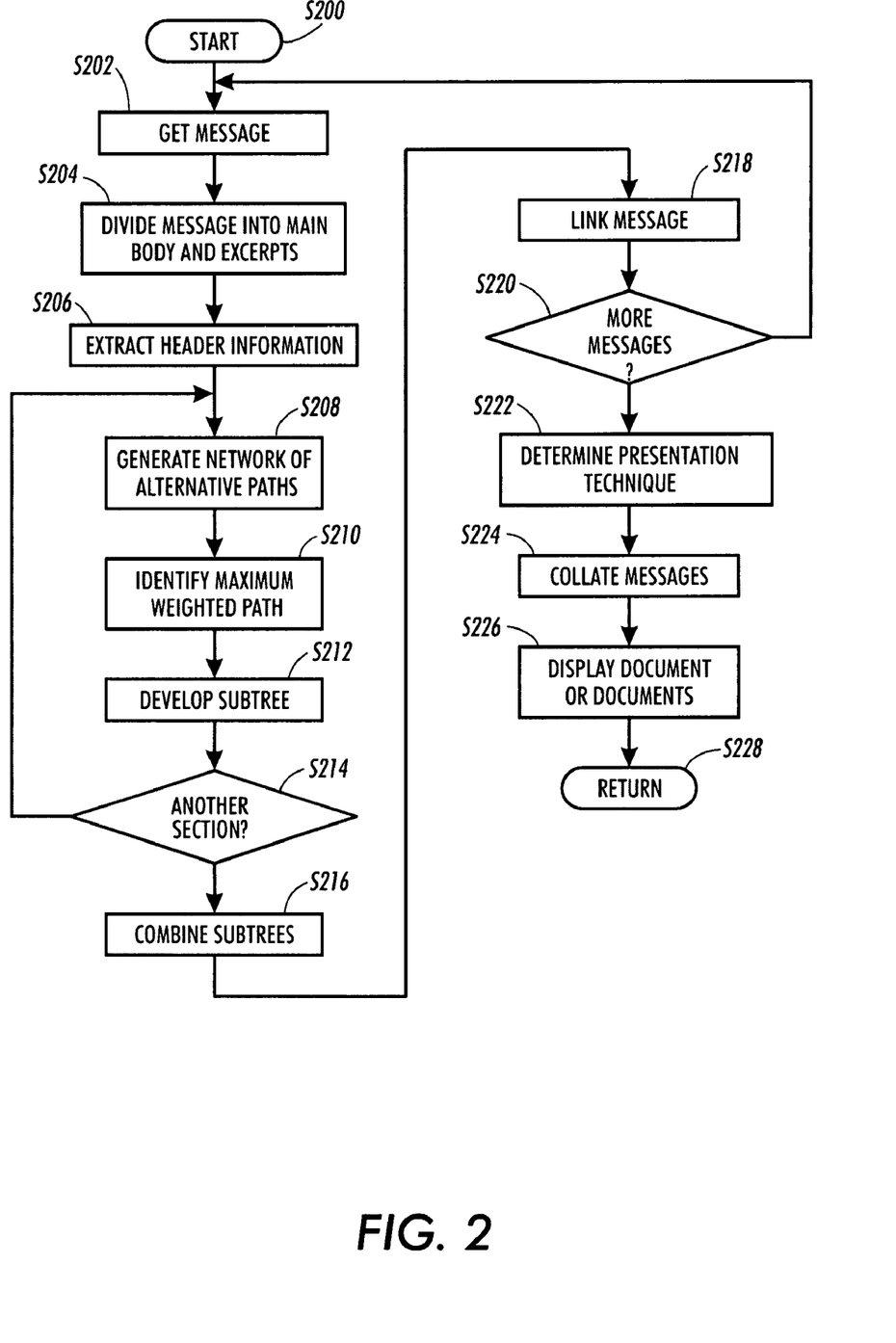
FIG. 2 shows a flowchart outlining a control routine of an embodiment of the present invention.

FIG. 2 shows a flowchart outlining a control routine in accordance with one embodiment. The flowchart provides a general outline for the processes performed by the method and apparatus of the present invention. The control routine starts at S200 and continues to S202. In S202, the control routine gets the first or next message in the collection and continues to S204.

In S204, the control routine divides the message into a main body and into excerpts from other messages that are either embedded in the main body or suffixed. This analysis is achieved by a procedural, top-down recursive dissent analyzer as described above. The control routine then continues to S206, where the control routine extracts and stores header information at the node and continues to S208. In S208, the control routine uses a weighted finite state grammar to create a network of alternative labelings for the lines of the current section as described above and continues to S210. In S210, the control routine identifies the maximally weighted path by performing a backward search and continues to S212. In S212, the control routine uses tags associated with the edges of the maximum weighted path to develop the subtree for the section, with interior nodes representing sequences/groups of like-type lines and continues to S214.

In S214, the control routine determines whether the message includes another section. If, in S214, the control routine determines that the message includes another section, then the control routine returns to S208. If, however, in S214, the control routine determines that there are no more sections, then the control routine continues to S216. In S216, the control routine combines all subtrees into a single tree and continues to S218. In S218, the control routine links the message to its predecessor in the collection and continues to S220.

In S220, the control routine determines if there are more messages in the collection to be analyzed. If, in S220 the control routine determines that there are more messages in the collection to be analyzed, then the control routine returns to S202. If, however, in S220, the control routine determines that there are no more messages in the collection that need to be analyzed, then the control routine continues to S222.

In S222, the control routine determines which of a number of different presentation techniques is to be used to display the message collection and then continues to S224. In S224, the control routine collates the messages in accordance with the determined presentation technique and continues to S226. In S226, the control routine displays the document or documents (if one document per thread) using the appropriate presentation technique and continues to S228. In S228, the control routine returns control of the display apparatus to the control routine that called the control routine on FIG. 2.

Figure 4:
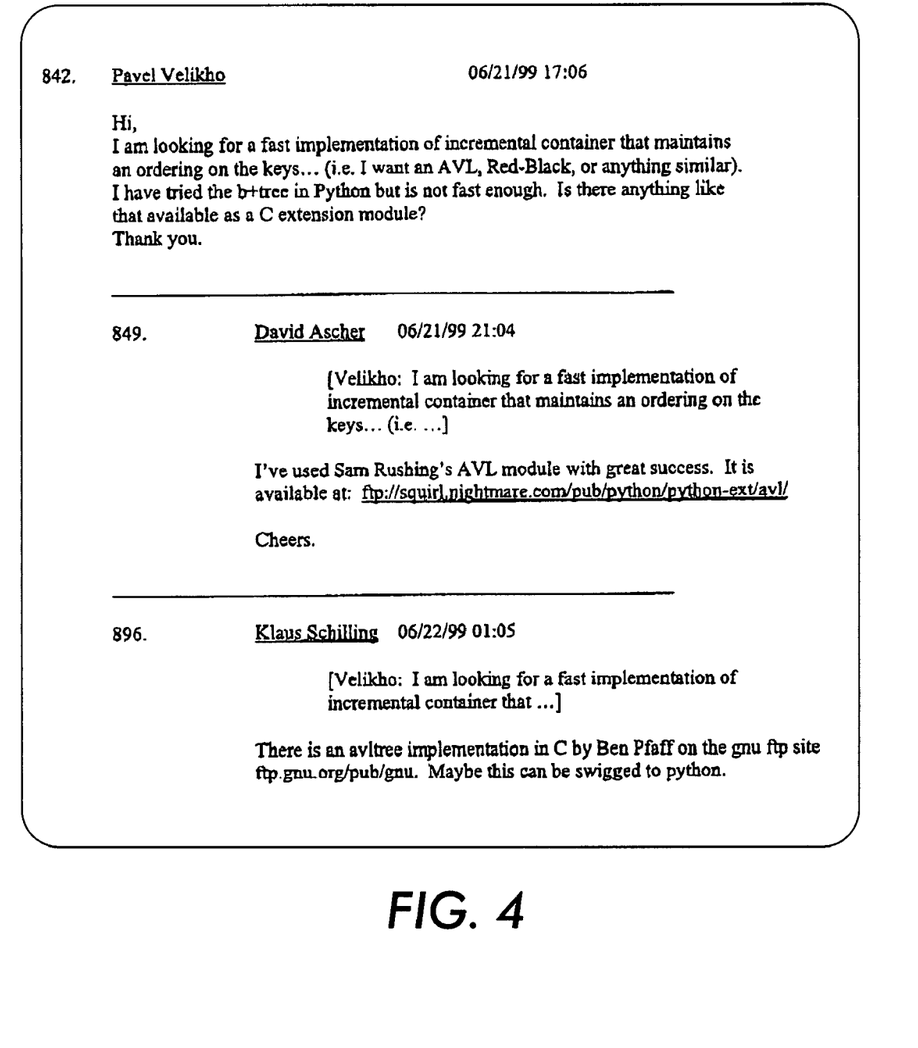
FIG. 4 shows a display of the thread of FIG. 3 using a semi-linear presentation technique in accordance with an embodiment of the present invention.
Figure 5:
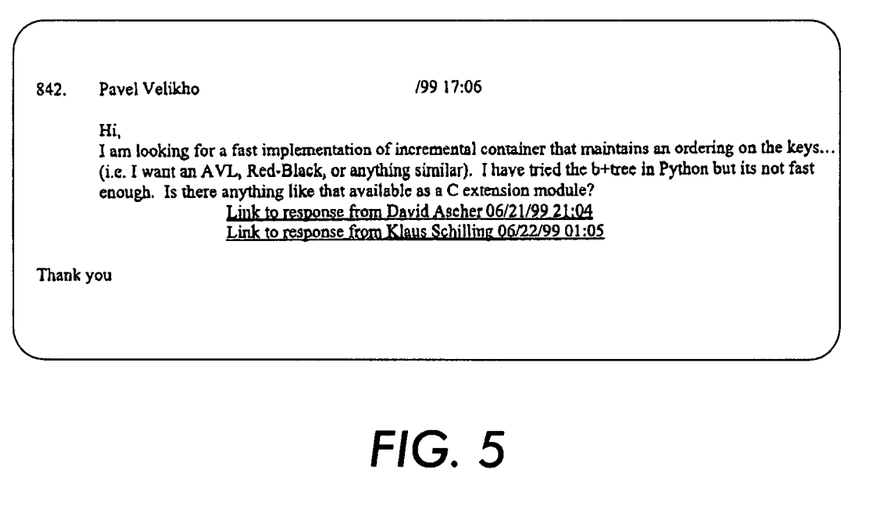
FIG. 5 shows a display of the thread of FIG. 3 using a response-interleaving presentation technique in accordance with an embodiment of the present invention.

FIG. 3 shows a display of a conventional digested thread using a conventional mailing list application. FIG. 4 shows a display of the thread of FIG. 3 with a semi-linear presentation technique. The redundant header information has been removed and the incorporated excerpts have been reduced. The responses have also been indented in the presentation. FIG. 5 shows a display in accordance with a second presentation technique by response-interleaving in accordance with the embodiment. The header information has been completely removed and links to responses are displayed rather than the entire responses with corresponding headers.

Figure 6:
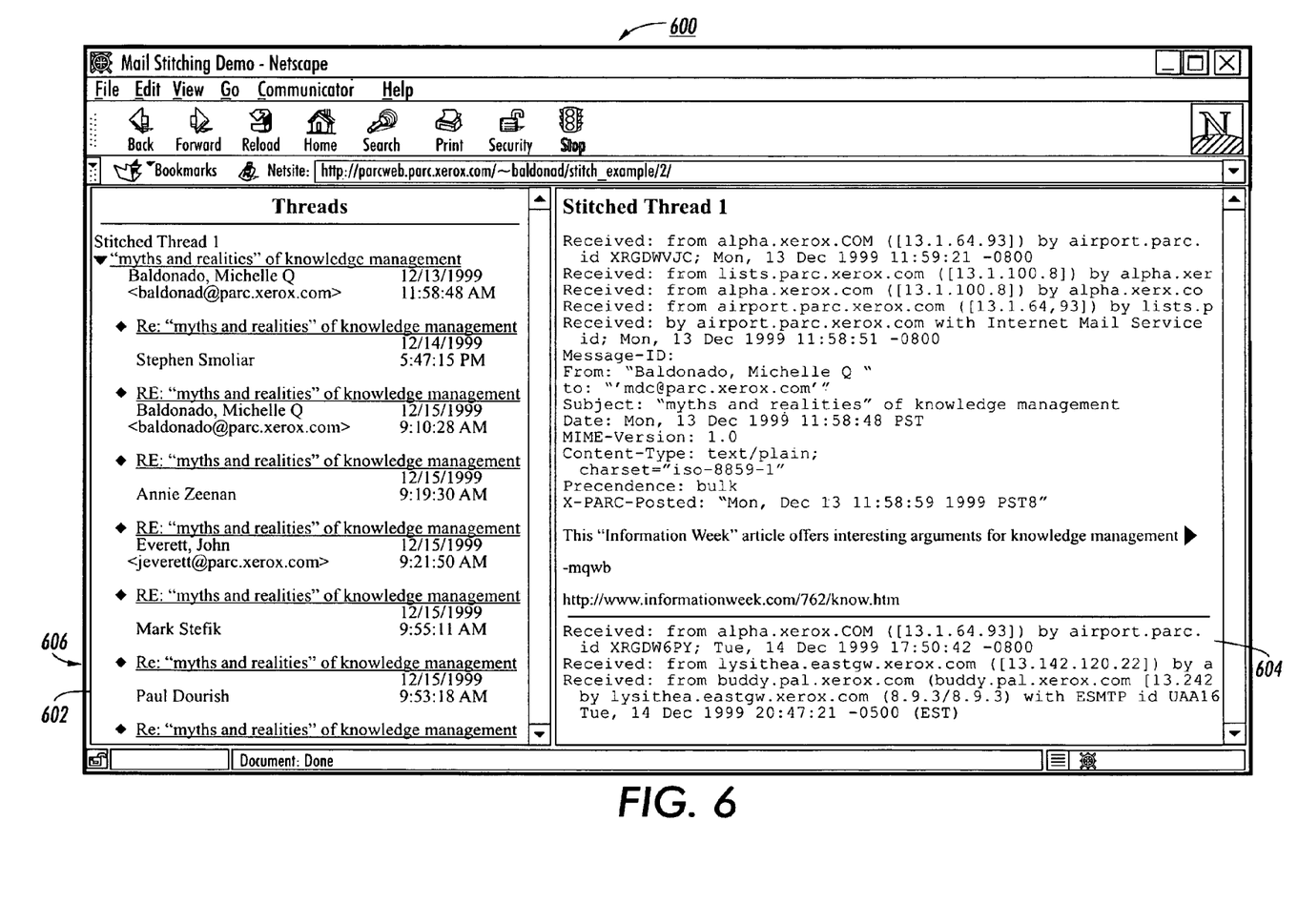
FIG. 6 shows another type of display of an e-mail thread also using a response-interleaving presentation technique in accordance with an embodiment of the present invention.

FIG. 6 shows another type of display 600 in accordance with the second presentation technique in accordance with another embodiment. The display 600 includes two frames 602 and 604. The first frame 602 displays a general outline view of the e-mail collection, divided into threads, while the second frame 604 displays the entire original content of the threads, in the same order. The first frame 602 and the second frame 604 are interactive in that a user may use the first frame 602 to cause scrolling within the second frame 604 using links 606 provided within the first frame 602.

Figure 7:
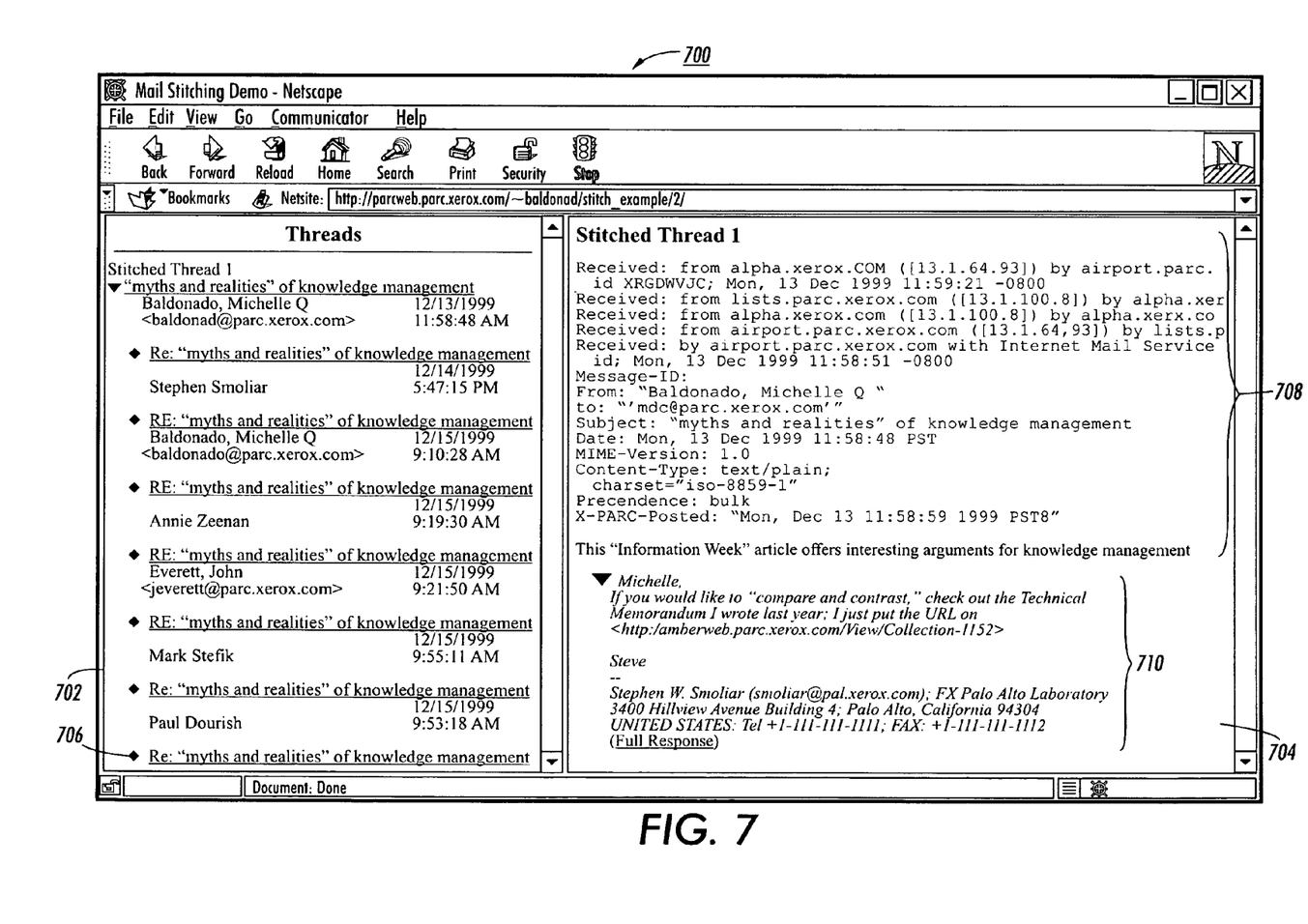
FIG. 7 shows the progress of the display of the e-mail thread of FIG. 6 after a user has requested that a response to a displayed message be interleaved in accordance with an embodiment of the present invention.

FIG. 7 shows a second display 700 of the collection of FIG. 6, after the user has requested that the response to the first quoted passage of the first message be shown. In a manner similar to the display 600 of FIG. 6, the display 700 includes a first frame 702 and a second frame 704. The first frame 702 includes a display of an outline view of the e-mail collection. The outline view includes links 706 that allow a user to navigate the thread display shown in the second frame 704. The second frame 704 shows the same material as frame 604 of FIG. 6, but, after the user request to display the response to the initial sentence of the message, the response 710 is incorporated into the display after that sentence.

As illustrated in FIG. 1, the computer controlled display system is implemented either on a single program general purpose computer, or separate program general purpose computer. However, the computer controlled display system can also be implemented on a special purpose computer, a programmed microprocessor or microcontroller and peripheral integrated circuit element, an ASIC or other integrated circuit, a digital signal processor, a hard wired electronic or logic circuit such as a discrete element circuit, a programmable logic device such as a PLD, PLA, FPGA, PAL, or the like. In general, any device capable of implementing a finite state machine that is in turn capable of implementing the flowchart illustrated in FIG. 2 can be used to implement the computer controlled display system according to this invention.

Furthermore, the disclosed method may be readily implemented in software using object or object-oriented software development environments that provide portable source code that can be used on a variety of computer or workstation hardware platforms. Alternatively, the disclosed computer controlled display system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The electronic message management systems and methods described above, however, can be readily implemented in hardware and/or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this instance, the methods and systems of this invention can be implemented as a routine embedded on a personal computer such as a Java® or CGI script, as a resource residing on a server or graphics workstation, as a routine embedded in a dedicated computer controlled display system, a web browser, an electronic message enabled cellular phone, a PDA, a dedicated computer controlled display system, or the like. The computer controlled display system can also be implemented by physically incorporating the system and method into a software and/or hardware system, such as the hardware and software systems of a dedicated computer controlled display system.

It is, therefore, apparent that there has been provided, in accordance with the present invention, systems and methods for computer controlled display. While this invention has been described in conjunction with embodiments thereof, it is evident that many alternatives, modifications and variations be apparent to those skilled in the applicable arts. Accordingly, Applicants intend to embrace all such alternatives, modifications and variations that follow within the spirit and scope of this invention.

What is claimed is:

1. A computer-implemented system for presenting message threads, comprising:
a memory; and
a processor operatively coupled to the memory and configured to execute computer executable program modules, including:
a grammar module defining a grammar comprising an array of arcs that each span a start state and an end state with each of the arcs associated with a line-group type test;
an analysis module comprising:
a parser module performing a procedural top-down recursive descent of a plurality of messages, comprising parsing features from the plurality of messages, which divide each message into a main body and one or more excerpts, matching each line in each of the main body and the excerpts to the start state and the end state in one of the arcs in the grammar, and evaluating the line-group type test associated with the arc;
an output network module building an output network comprising output network arcs that each correspond to the arcs in the grammar, each output network arc being assigned a cumulative weight that comprises weights assigned by the line-group type tests for the corresponding arcs in the grammar along a partial path through the output network terminating at that arc;
a message tree module creating a message tree comprising the maximally weighted paths in a forward direction through the output network for each of the main body and the excerpts;
a relationship module relating the messages in the message tree comprising, matching the excerpts in the message tree with a source message in the plurality of messages and identifying one or more predecessor message in the plurality of messages for each such main body in the message tree; and
a presentation module collating the source and the predecessor messages as related into a conversational document form.

2. A system according to claim 1, further comprising at least one of:
an extractor module extracting header information from the message, which is stored into one such node; and
a concatenation module logically concatenating the main body of the message into a single extent.

3. A system according to claim 1, further comprising:
a finite state machine partitioning the main body and the excerpts into the line-group types through a weighted finite state grammar; and
an output network of alternative paths comprising arcs that simultaneously correspond to a line of the message and an arc of the weighted finite state grammar.

4. A system according to claim 1, further comprising at least one of:
a thread formatter creating a compressed form of each message; and
a block formatter providing each message that is in reply to another such message as an annotation.

5. A computer-implemented method for presenting message threads, comprising:
defining a grammar comprising an array of arcs that each span a start state and an end state with each of the arcs associated with a line-group type test;
performing a procedural top-down recursive descent of a plurality of messages, comprising:
parsing features from the plurality of messages, which divide each message into a main body and one or more excerpts; and
matching each line in each of the main body and the excerpts to the start state and the end state in one of the arcs in the grammar and evaluating the line-group type test associated with the arc;
building an output network comprising output network arcs that each correspond to the arcs in the grammar, each output network arc being assigned a cumulative weight that comprises weights assigned by the line-group type tests for the corresponding arcs in the grammar along a partial path through the output network terminating at that arc;
creating a message tree comprising the maximally weighted paths in a forward direction through the output network for each of the main body and the excerpts;
relating the messages in the message tree comprising, matching the excerpts in the message tree with a source message in the plurality of messages and identifying one or more predecessor; message in the plurality of messages for each such main body in the message tree; and
collating the source and the predecessor messages as related into a conversational document form.

6. A method according to claim 5, further comprising at least one of:
extracting header information from the message, which is stored into one such node; and
logically concatenating the main body of the message into a single extent.

7. A method according to claim 5, further comprising:
partitioning the main body and the excerpts into the line-group types through a weighted finite state grammar; and
creating an output network of alternative paths comprising arcs that simultaneously correspond to a line of the message and an arc of the weighted finite state grammar.

8. A method according to claim 5, further comprising at least one of:
creating a compressed form of each message; and
providing each message that is in reply to another such message as an annotation.

9. A computer-implemented system for presenting message threads, comprising:
a memory; and
a processor operatively coupled to the memory and configured to execute computer executable program modules, including:
a grammar module defining a grammar comprising an array of arcs that each span a start state and an end state with each of the arcs associated with a procedurally-coded test;
a parser module parsing features from a plurality of messages, which divide each message into a main body and one or more excerpts through a procedural top-down recursive descent;
a relationship module matching each line in the main body and the excerpts to the start state and the end state in one of the arcs in the grammar and evaluating the procedurally-coded test associated with the arc;
a network module creating an output network comprising output network arcs that each correspond to the arcs in the grammar, each output network arc being assigned a cumulative weight that comprises weights assigned by the procedurally-coded tests for the corresponding arcs in the grammar along a partial path through the output network terminating at that arc and creating a message tree comprising the maximally weighted paths in a forward direction through the output network for each of the main body and the excerpts;

a relationship module relating the messages in the message tree comprising, matching the excerpts in the message tree with a source message in the plurality of messages and identifying one or more predecessor message in the plurality of messages for each such main body in the message tree; and a presentation module forming a collection of annotations comprised for each of the excerpts either having a matching source message or at least one predecessor message.

10. A system according to claim 9, further comprising at least one of:

a extraction module storing header information from each message into one such node; and a concatenation module logically concatenating the main body of the message into a single extent.

11. A system according to claim 9, wherein the partitions of the line-group types are formed through a weighted finite state grammar.

12. A system according to claim 9, wherein the alternative paths of the output network comprise arcs that simultaneously correspond to a line of the message and an arc of a weighted finite state grammar.

13. A system according to claim 9, comprising:

a compressed presenter presenting the document as a compressed form of each message in a semi-linear sequence; and a block presenter presenting the document as a block that provides each message that is in reply to another such message as an annotation.

14. A system according to claim 9, wherein the messages are selected from the group comprising email and documents.

15. A computer-implemented method for presenting message threads, comprising:

defining a grammar comprising an array of arcs that each span a start state and an end state with each of the arcs associated with a procedurally-coded test;

parsing features from a plurality of messages, which divide each message into a main body and one or more excerpts through a procedural top-down recursive descent;

matching each line in the main body and the excerpts to the start state and the end state in one of the arcs in the grammar and evaluating the procedurally-coded test associated with the arc;

creating an output network comprising output network arcs that each correspond to the arcs in the grammar, each output network are being assigned a cumulative weight that comprises weights assigned by the procedurally-coded tests for the corresponding arcs in the grammar along a partial path through the output network terminating at that arc;

creating a message tree comprising the maximally weighted paths in a forward direction through the output network for each of the main body and the excerpts;

relating the messages in the message tree comprising, matching the excerpts in the message tree with a source message in the plurality of messages and identifying one or more predecessor message in the plurality of messages for each such main body in the message tree; and forming a collection of annotations comprised for each of the excerpts either having a matching source message or at least one predecessor message.

16. A method according to claim 15, further comprising at least one of:

storing header information from each message into one such node; and logically concatenating the main body of the message into a single extent.

17. A method according to claim 15, further comprising:

forming the partitions of the line-group types through a weighted finite state grammar.

18. A method according to claim 15, wherein the alternative paths of the output network comprise arcs that simultaneously correspond to a line of the message and an arc of a weighted finite state grammar.

19. A method according to claim 15, comprising:

presenting the document as a compressed form of each message in a semi-linear sequence; and presenting the document as a block that provides each message that is in reply to another such message as an annotation.

20. A method according to claim 15, wherein the messages are selected from the group comprising email and documents.

* * * * *